May 22, 1934.
L. F. SPEAR
Re. 19,176
OIL BURNER
Original Filed Oct. 12, 1931 2 Sheets-Sheet 1
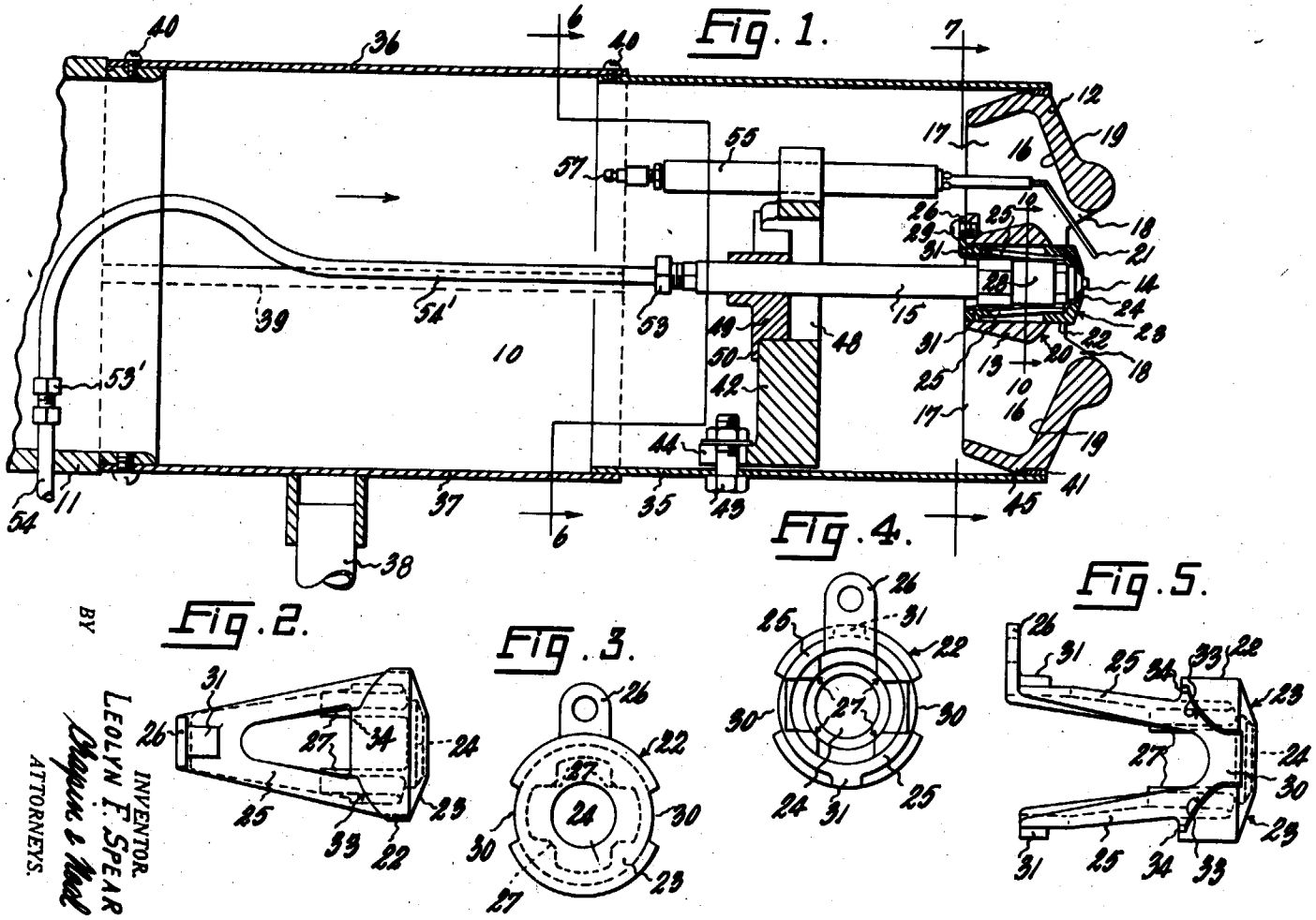
INVENTOR.
LEOLYN F. SPEAR
BY
Chapin & Neal
ATTORNEYS.

May 22, 1934. L. F. SPEAR Re. 19,176

OIL BURNER

Original Filed Oct. 12, 1931 2 Sheets-Sheet 2

INVENTOR.
LEOLYN F SPEAR
BY Chapin & Neal
ATTORNEYS.

Reissued May 22, 1934

Re. 19,176

UNITED STATES PATENT OFFICE 19,176

OIL BURNER

Leolyn F. Spear, Westfield, Mass., assignor to Gilbert & Barker Manufacturing Company, West Springfield, Mass., a corporation of Massachusetts Original No. 1,906,343, dated May 2, 1933, Serial No. 568,383, October 12, 1931. Application for reissue March 22, 1934, Serial No. 716,864

16 Claims. (Cl. 158—1.5)

This invention relates to improvements in oil burners and, more particularly, to oil burners of the type disclosed in the U. S. patent to Hannibal A. Kunitz, No. 1,832,131, granted November 17, 1931.

The aforesaid burner is of the external mixing type, utilizing a pressure atomizing nozzle or other means, to produce a hollow conical spray of oil. It differs from the conventional burner of this general type in that the air is fed to and mixed with the conical oil spray in a special manner. The air is introduced under controlled conditions of pressure and velocity and divided into two streams which are directed in forwardly converging relation and from opposite sides of the oil spray to impinge thereon at a location near but spaced forwardly from the oil nozzle or apex of the spray. A relatively flat flame, spread laterally over a considerable area but maintained of short length, is one of the results flowing from the special way in which air is fed to and mixed with the oil.

The general object of this invention is to provide improvements for keeping the oil nozzle and adjacent parts as cool as possible and as free of oil as possible to minimize, if not entirely avoid, the carbonization of such nozzle and parts and to do all this in a novel way which will not interfere with the special action of a burner of the aforesaid type and which will accomplish certain needed results in this special type of burner to improve its action.

This and other objects will best be understood as the detailed description proceeds and will be pointed out in the appended claims.

The invention will be disclosed with reference to the accompanying drawings, in which:

Fig. 1 is a fragmentary sectional elevational view of a burner embodying the invention;

Figs. 2, 3, 4 and 5 are top plan, front elevational, rear elevational and side elevational views, respectively, showing the nozzle shield;

Figure 6:
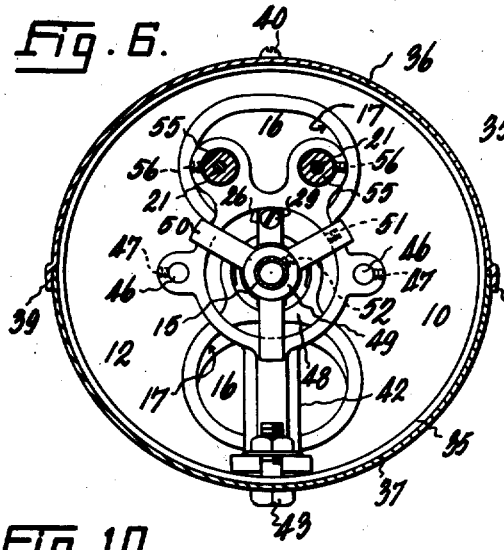
Figure 9:
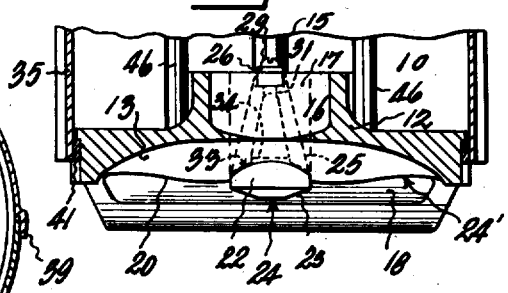
Figure 7:
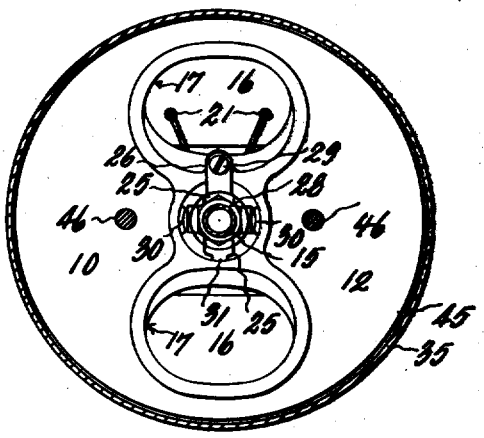
Figure 8:
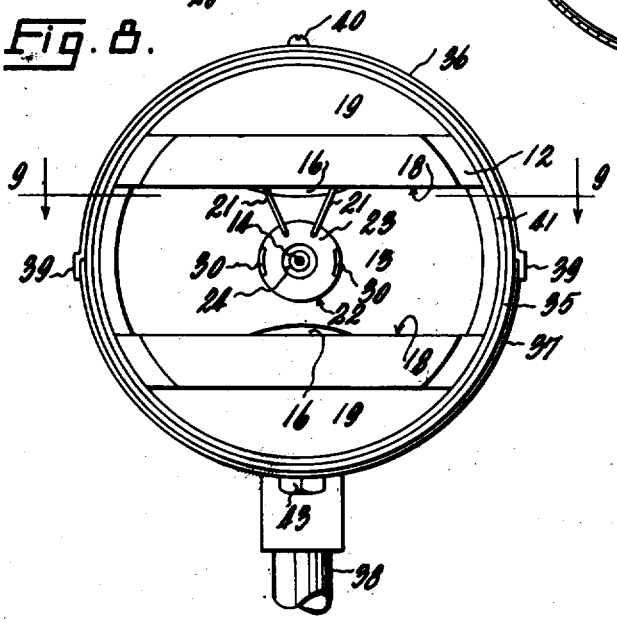

Figs. 6 and 7 are cross sectional views taken on the lines 6—6 and 7—7, respectively, of Fig. 1;

Fig. 8 is a front elevational view of the burner;

Fig. 9 is a sectional plan view taken on the line 9—9 of Fig. 8; and

Figure 10:
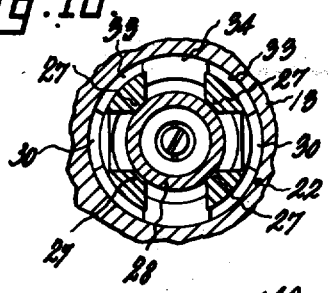

Fig. 10 is a fragmentary cross sectional view taken on the line 10—10 of Fig. 1.

Referring to these drawings, I have shown so much of the aforesaid type of burner as is necessary for an understanding of the application of my improvements thereto. Much of the burner structure has been omitted as unnecessary to an understanding of the present invention.

The air tube of the prior burner is shown at 10 in Fig. 1 as connected at one end to the outlet of a fan or blower,—a portion of which is shown at 11. Air at low pressure,—say for example at a pressure of a fraction of an ounce,—is supplied to tube 10 and travels in the direction of the arrow. At the outlet end of this tube is mounted an air head 12, having a substantially diametrical and, as herein shown, horizontal baffle means preferably in the form of a bridge portion 13 (see also Fig. 8) with air passages above and below the same. The head 12 closes the outlet end of the air tube except for the air passages alluded to and certain other passages to be described. The bridge 13 is centrally perforated to receive an oil nozzle 14 which may be and preferably is of the well known mechanical atomizing type. Oil is supplied to this nozzle by way of a pipe, shown in part at 15, under relatively heavy pressure and issues from the nozzle in the form of a fog-like spray of substantially hollow, conical formation. This is the shape of the spray at and near the point of its emission from the nozzle but the formation of the spray, or the flame resulting from the burning of the oil and air mixture, is later changed as will appear, when subjected to the action of the impinging air streams.

The air passages, both upper and lower, are designated 16. These are formed substantially as disclosed in the aforesaid patent. Each has an inlet 17 of roughly elliptical shape in cross section (Fig. 7) and an outlet 18 of substantially rectangular shape in cross section (Fig. 9). Intermediate the inlet and outlet the cross sectional shape of each passage changes progressively. Each air passage also changes in direction, starting at the inlet in a direction parallel to the axis of the oil nozzle and turning until it is steeply inclined to such axis at the outlet end (Fig. 1). The outer wall 19 of each passage is steeply inclined to deflect the air stream inwardly and the two walls 19 converge in a direction forwardly and inwardly. The face of bridge 13 which in part defines the inner wall of each air passage, is convexly curved as at 20. Preferably, this bridge as viewed in plan (Fig. 9) has the contour of an ogee curve as at 24′ rather than being straight.

The effect of these two diametrically opposed air passages is to change the direction of the air streams and distribute the air laterally so that it issues in two wide, substantially flat, sheet-like streams. These streams are directed in converging relation with a tendency to meet in a line located in front of the oil nozzle 14. These streams impinge on the oil spray, after it leaves the nozzle 14, from opposite sides and the result is a flame which is wide, relatively flat and of relatively short length. The shape is changed from the usual circular cross sectional form to a flattened and roughly elliptical cross sectional form, all as disclosed in said patent.

The mixture of air and oil is ignited in any suitable way, as by an electric spark produced between electrodes 21 (Figs. 1 and 8). If desired, these electrodes may be located out of the direct path of the oil spray and if necessary, the air stream will blow the arc-like spark into the oil spray to vaporize and ignite the same.

According to this invention, the oil nozzle is not directly supported from the bridge 13 but through the intermediary of a shield member which enables a substantial reduction in the heat transferred by conduction from the air head 12 and its bridge 13, protects the nozzle 14 from the direct heat of the furnace and provides for the admission of air streams around the nozzle and between the shield member and bridge for cooling purposes. This shield member, shown separately in Figs. 2 to 5 inclusive, comprises a hollow cylindrical body 22, the front end of which is partially closed by a conical wall 23, leaving a central circular opening 24 through which the spray from nozzle 14 is emitted. Integrally connected to the back end of this body 22 are upper and lower rearward extensions 25 of roughly skeleton triangular form, one of which has an upstanding and perforated lug 26. The openings through the extensions allow equalization in pressure of the air streams flowing on opposite sides thereof. Inside the hollow body 22 are four ridges 27 extending radially inwardly a short distance for contact at spaced points only with the nozzle, or some supporting part therefor such as the cylindrical member 28 connected therewith. The central perforation in bridge 13 is of a diameter such as to closely fit the cylindrical body 22 of the shield (Figs. 8 and 10). The shield is inserted in this opening and secured to the bridge by a screw 29 passing through the perforated lug 26 into the back wall of the bridge (Figs. 1 and 7). The body 22 closes the central opening in bridge 13 except for two diametrically opposed passages formed between the bridge and body by notches 30 formed in the periphery of the body (Figs. 8 and 10). At the rear end of each extension 25 are raised portions 31 which contact with the bridge. The nozzle is supported within the shield on the four ridges 27 in spaced concentrical relation, leaving channels through which air can flow around the member 28 and nozzle 14 to the front end of the shield where it is emitted in an annular stream through the central opening 24, being deflected inwardly by the conical wall 23 and caused to sweep across the face of the oil nozzle 14.

It is to be noted that the shield is supported from the bridge 13 so that it has only a very small area of contact therewith. By so doing, the transfer of heat by conduction from the bridge to the shield is minimized. The shield has only four areas which contact with the bridge, viz., the two small areas of the portions 31 at the rear and two small areas of the body 22 at the front. The rear edge of such body is curved as at 33, to approximate the configuration of the line of intersection between the cylindrical body 22 and the curved outer face 20 of bridge 13, except at the center where a bearing spot 34 is provided. As will be seen from Fig. 9, the curved edge 33 substantially coincides with the aforesaid line of intersection and lies just enough back of it to serve the purpose of preventing escape of air. This leaves only a small area for contact with the bridge and mainly that due to spots 34. The curved edges 33 are also important for the reason that they direct the air streams to the side openings 30, avoiding eddies and the like which would interfere with the desired smooth flow of air to such openings.

It is also to be noted that the nozzle 14, or more properly its attached member 28, is likewise supported from the shield in a similar way. The member 28 bears on the shield only at the four places 27 and each of these is of small area. It will be clear that the transfer of heat from the bridge to nozzle by direct conduction is materially reduced and cut down to a relatively small amount. In addition to restricting the transfer of heat to the aforesaid parts, means are provided for cooling them as air will flow all around the body of member 28, except for the small areas in contact with ridges 27, and all around the body of the nozzle 14 and across the tip end thereof. Also air will flow between the shield and bridge, except for the small contacting areas 31 and 34, such air being emitted from the side passages 30. The conical front wall 23 of the shield protects the nozzle 14 from much of the direct effects of the heat of the furnace, to which it otherwise would be subjected, and this wall is also cooled to some extent by the annular air stream flowing along its inner surface. I prefer to have the outer surface of this wall and the exposed cylindrical surface of the shield polished in order to minimize the deposit of carbon thereon. A bright polished surface reflects rays and does not absorb so much heat as a rough and dark surface. And the cooler the surface is kept the less likelihood there is of carbonization.

There remain to be described certain constructional details of the burner. The air tube 10 is desirably constructed in three parts,—a front section 35 of true tubular form and upper and lower rear sections 36 and 37, respectively, which are enough larger in diameter so that the front section can be partially telescoped within them. The lower rear section 37 is semi-cylindrical in form and is spot welded to the front section 35. It is also secured to the outlet end of blower 11 and supported by a standard shown in part at 38. The upper rear section 36 constitutes a removable cover. It is semi-cylindrical in form except for the flanges 39 along its lower edges, which flanges overlap the lower section 37. The cover section 36 is held in place by two screws 40. When cover 36 is removed, the air head, oil nozzle, spark electrodes and associated parts may be drawn back into the rear section of the air tube and removed through the open upper end of such section. To enable this result, the air head 12 has a sliding fit at the front end of the air tube with a ring 41 secured therein, and the head is connected to and held in place by a bracket 42. This bracket is secured to section 35 by a bolt 43 passing through an open ended slot 44. By removing bolt 43, the bracket may be drawn back, carrying with it the air head and all associated parts in assembled relation. As soon as the air head is drawn back far enough to free it from ring 41, it will slide freely since it then fits only loosely in tube 35. There is preferably a shoulder 45 on the head to abut ring 41 as a stop for the purpose of locating the head in proper position and of making more difficult the escape of air between the head and ring 41. The head has two rearwardly extending studs 46 fixed thereto which pass through bracket 42 and are fixed thereto by set screws 47. In the center of this bracket is a cylindrical hole 48 (Figs. 1 and 6) in which is seated a spider 49, having flanges 50 to abut the rear face of the bracket. A set screw 51 (Fig. 6) holds the spider in place in the bracket and the oil pipe 15 is held in place in the spider by a set screw 52. This oil pipe is connected by a union 53 (Fig. 1) to an oil supply pipe 54 through the intermediary of a section 54′ and two detachable connections 53 and 53′ of any suitable form. The section 54′ is preferably somewhat flexible and is usually in the form of a copper tube having a bend therein as shown. The spark electrodes 21 pass through and are suitably fixed in position in insulating tubes 55, which each pass through the bracket 42 and are fixed thereto by set screws 56. The electrodes carry terminals 57 at their rear ends for connection to ignition wires (not shown). It will be seen that when cover 36 is removed, access may be had for disconnecting such wires from the terminals 57, for disconnecting connections 53 and 53′ and removing the oil pipe 54′, and for removing bolt 43. Then, the bracket 42 may be pulled rearwardly and lifted through the open upper end of the rear section of the air tube. Also, the oil nozzle may be removed without removing the air head, if desired, by loosening set screw 54 and drawing the spider 49 out of hole 48, carrying with it the pipe 15 and attached nozzle 14.

The operation, broadly, is like that of the burner of said patent but it is to some extent modified and improved by the use of the nozzle shield of this invention. The air emitted through the central opening 24 in the shield does not alter the action so far as the flat flame effect is concerned. Such air issues in an annular stream of circular cross section in enveloping relation with the oil spray which is at that time of hollow conical form. The larger volume of air, which is divided into the two opposing and converging streams, does not impinge on the oil spray until it reaches a point somewhat ahead of the tip of nozzle 14 and these streams will do their work as effectively notwithstanding that the oil spray is enveloped by an annular air stream. Such annular air stream is a help in the same way that it is a help in the ordinary type of mechanical atomizing burner, where the main air stream is annular rather than divided into two flat sheets, as herein shown. These two flat streams, in impinging on the oil spray, tend to squeeze the latter between them and create a certain amount of back pressure and some small particles of oil can and do accumulate on the nozzle and bridge. Ordinarily, without the shield of this invention, this back current causes oil spray to deposit on the nozzle tip and on the wall 20 of bridge 13. The convex outer surface of this bridge is a help in minimizing such trouble at points above and below the oil nozzle but it does not entirely cure the trouble at points to the right and left of the nozzle in the central area of the bridge and for this purpose I employ the air streams which issue at the sides of the shield through openings 30. Also, the central annular stream of air through opening 24 helps by sweeping into the main volume of the air stream the particles of oil which would otherwise become deposited on the bridge and nozzle. The small air streams issuing at the sides of the nozzle shield are most important in that they counteract the back pressure of the impinging main air streams and help to prevent the deposit of oil on bridge 13. These side streams of air are purposely located as shown in order not to interfere with the action of the impinging main air streams and the flat flame produced thereby. Were they placed otherwise than in the neutral territory between the impinging streams, the side streams would interfere to some extent with the flat flame effect. The extent of interference varies inversely with the amount of oil and air consumed by the burner. In burners using a relatively large amount of oil, there would be so much air supplied by way of the impinging air streams that the interference therewith by the small side air streams would be negligible. But in small burners like the present one, where only a relatively small amount of oil is burned, the interference is appreciable and hence the necessity for the described location of the side air streams. The air supply is relatively small and so small that the action of the impinging streams would be detrimentally affected by the small auxiliary air streams if these issued at any points such as to deflect the main air streams. For example, if air were admitted all around the outer periphery of shield 22, the flat flame effect would be impaired because the annular air streams at certain points would deflect the main air streams out of their intended directions.

The action of the flat flame burner is actually improved by the use of the nozzle shield because a better lateral distribution of air is effected. Heretofore, there was a tendency for too much air to go to the center and the flame produced tended to assume somewhat of a fishtail shape. That is, there was a hollow center in the central rear portion of the flame near the nozzle. To overcome this, the shield is made to project materially beyond the bridge 13 and partially into the path of the main air streams. Part of such streams strike the cylindrical projecting portion 22 of the shield, both from above and below, and such parts are divided, flowing some to the right and some to the left of the shield and oil nozzle. Less air goes to the center and more to the sides and a marked improvement in the lateral distribution of air results. The auxiliary side air streams at 30 also feed air at points to the right and left of the oil nozzle where air is needed. These two provisions result in a better and more uniform distribution of air and "fishtail" formation of the fire is materially reduced. The ogee shape of the bridge 13 also contributes materially to a better lateral distribution of air, especially in burners which consume a relatively small amount of oil and thus use only a small amount of air. When the main air streams are divided, as just described, by the upper and lower peripheral portions of the shield, a suction is produced between the divided air streams. This suction assists in producing an intimate mixture of the oil spray and the air streams and in stabilizing the ignition zone. Combustion is materially improved thereby.

It will be seen that the invention provides means for counteracting the backward eddy of oil spray which is peculiar to the burner described, where the air is fed to the oil spray in two flat converging streams, as distinguished from the usual feed of air equally all around the circle of the spray. This avoids much of the carbonizing of the nozzle 14 and bridge 13 which would otherwise occur. The polished conical wall 23 of the shield also protects the nozzle itself from much of the carbonization which might otherwise occur. The remaining provisions for keeping down carbonization depend on the cooling effect of the parts. The transfer of heat to the nozzle from the bridge is kept down by the reduction in the area effective for conduction of heat between these parts. Also, air is admitted between the bridge 13 and shield 22 and between the shield and nozzle 14 for cooling purposes. And the air used for cooling is emitted in directions such as to sweep across the exposed face of the nozzle 14 and keep it free of oil. The exposed face of the shield, being located in the main air streams, is also kept free of oil particles by the sweeping effect of such streams. The nozzle is thus kept cool by three different expedients. Conduction of heat from the bridge is reduced; reflected heat from the furnace to the nozzle is reduced by the coverage due to the conical wall 23; and air is admitted all around the nozzle to cool it. It is to be noted that when the burner stops, the air flow does not entirely cease because the natural draft of the furnace will cause some air to flow through the described passages for cooling purposes.

It is most important to keep the nozzle cool. If it is allowed to get hot, the heat will crack the oil within the nozzle and a residue will be deposited therein. It is almost vital to keep the nozzle cool if carbon deposits therein are to be avoided. Also, if the nozzle is hot, the oil in it expands after the burner stops and drips over the external face thereof. There is at that time no atomization of such oil and it carbonizes. Deposited carbon acts like a wick and absorbs more oil which carbonizes and adds to the trouble. The blackened nozzle becomes even hotter because the rough black surface absorbs more heat rays than a bright polished surface. The action continues and eventually a heavy layer of carbon is formed. Oil absorbed by such layer burns like a smoky torch after the burner has stopped still further heating the nozzle and making the conditions worse.

The shield avoids, or at least substantially reduces, carbon troubles as above described. It also, by its special design cooperates in a special manner with the special type of burner described and materially improves the operation as above set forth.

The invention has been disclosed herein, in an embodiment at present preferred, for illustrative purposes, but the scope of the invention is defined by the appended claims rather than by the foregoing description.

I claim:

1. In an oil burner, means for producing a substantially conical spray of oil, means for supplying air to the oil spray in two main streams one on each of two opposite sides of said spray and for directing said streams in forwardly converging relation so as to impinge on the spray after it leaves the first named means, and means for admitting additional air from each of two opposite sides of the first named means which last named sides are located substantially at right angles to the first named sides.

2. In an oil burner, means for producing a substantially conical spray of oil, means for supplying air to the oil spray in two main streams one on each of two opposite sides of said spray and for directing said streams in forwardly converging relation so as to impinge on the spray after it leaves the first named means, and deflecting means located one on each of said two sides and adjacent said first named means and extending into the path of said air streams at the central portions thereof for divinding the same at least in part and causing some of the air delivered at the center of the spray to flow laterally in opposite directions and be distributed at the sides of the spray.

3. In an oil burner, means for producing a substantially conical spray of oil, means for supplying air to the oil spray in two main streams one on each of two opposite sides of said spray and for directing said streams in forwardly converging relation so as to impinge on the spray after it leaves the first named means, and deflecting means located one on each of said two sides and adjacent said first named means and extending part way into the path of said air streams at the central portion thereof for dividing portions of the air in such streams and creating between such portions a suction effect at the central portion of the spray.

4. In an oil burner, means for producing a substantially conical spray of oil, means for supplying air to the oil spray in two main streams one on each of two opposite sides of said spray and for directing said streams in forwardly converging relation so as to impinge on the spray after it leaves the first named means, and means for admitting an annular stream of air around said first named means to impinge on the oil spray substantially uniformly at all points around the circle of the spray before said spray is subjected to the impinging action of the first named air streams.

5. In an oil burner, means for producing a substantially conical spray of oil, means for supplying air to the oil spray in two main streams one on each of two opposite sides of said spray and for directing said streams in forwardly converging relation so as to impinge on the spray after it leaves the first named means, means for admitting an annular stream of air around said first named means to impinge on the oil spray substantially uniformly at all points around the circle of the spray before said spray is subjected to the impinging action of the first named air streams, and means for admitting air in directions parallel to the axis of the spray and on opposite sides thereof, which sides are located at right angles to the first named sides.

6. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, said last named passages located substantially at right angles to the first named passages and communicating with said central opening and thus with said conduit, and a mechanical atomizing nozzle mounted within said hollow shield and arranged to emit through said central aperture a substantially conical spray of oil.

7. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, said last named passages located substantially at right angles to the first named passages and communicating with said central opening and thus with said conduit, and a mechanical atomizing nozzle supported within said shield in spaced concentrical relation and arranged to emit through said central aperture a substantially conical spray of oil, the interior of said hollow shield communicating with said central opening to permit air from said conduit to flow around the nozzle and be emitted from the central aperture in said shield.

8. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, said last named passages located substantially at right angles to the first named passages and communicating with said central opening and thus with said conduit, and a mechanical atomizing nozzle supported within said shield in spaced concentrical relation and arranged to emit through said central aperture a substantially conical spray of oil, the interior of said hollow shield communicating with said central opening to permit air from said conduit to flow around the nozzle and be emitted from the central aperture in said shield, said hollow shield having radial openings to interconnect the hollow interior of the shield and the second named air passages.

9. In an oil burner, an air conduit, a closure head mounted in the outlet end of said conduit and having a central axial opening therethrough and two diametrically opposed air outlet passages therethrough disposed one on each side of said central opening, a shield having a hollow cylindrical portion with diametrically opposed notches in its outer periphery mounted in said central opening so that the passages afforded by said notches between the shield and the wall of said central opening are disposed at right angles to the first named air passages, said shield having a partly conical front wall with a central aperture therein, and a mechanical atomizing nozzle mounted within said hollow cylindrical portion in spaced concentrical relation therewith and with its tip spaced back from said conical wall to allow air to flow between it and said wall, said nozzle arranged to emit through said aperture a conical spray of oil.

10. In an oil burner, a tubular conduit for supplying air, an atomizing nozzle located substantially centrally at the outlet end of said conduit for producing a substantially conical spray of oil, an air head at the outlet end of said conduit having upper and lower front walls converging toward one another in a forward direction and terminating in a substantially rectangular discharge mouth with long upper and lower edges and relatively short side edges, baffle means at the right and left sides of said nozzle for intercepting the straight flow of air through said discharge mouth adjacent the sides of said nozzle, said baffle means cooperating with the converging front walls of said head for directing streams of air, one from above and one from below said nozzle, in forwardly converging relation to impinge on said conical oil spray after it leaves said nozzle and tending to flatten the shape of the flame produced by said burner, said baffle means providing for the admission of two straight flow streams of air through said discharge mouth at positions spaced from the sides of said nozzle, one stream at the right side and one at the left side of said nozzle.

11. In an oil burner a tubular conduit for supplying air, an atomizing nozzle located substantially centrally at the outlet end of said conduit for producing a substantially conical spray of oil, an air head at the outlet end of said conduit having upper and lower front walls converging toward one another in a forward direction and terminating in a substantially rectangular discharge mouth with long upper and lower edges projecting forwardly of relatively short side edges, baffle means at the right and left sides of said nozzle located rearwardly of said upper and lower edges of said mouth for intercepting the straight flow of air through said discharge mouth adjacent the sides of said nozzle, said baffle means cooperating with the converging front walls of said head for directing streams of air, one from above and one from below said nozzle, in forwardly converging relation to impinge on said conical oil spray after it leaves said nozzle and tending to flatten the shape of the flame produced by said burner, said baffle means providing for the admission of two straight flow streams of air through said discharge mouth at positions spaced from the sides of said nozzle, one stream at the right side and one at the left side of said nozzle.

12. In an oil burner, a tubular conduit for supplying air, an atomizing nozzle located substantially centrally at the outlet end of said conduit for producing a substantially conical spray of oil, an air head at the outlet end of said conduit having upper and lower front walls converging toward one another in a forward direction and terminating in a substantially rectangular discharge mouth with long upper and lower edges and relatively short side edges, baffle means at the right and left sides of said nozzle for intercepting the straight flow of air through said discharge mouth adjacent the sides of said nozzle, said baffle means cooperating with the converging front walls of said head for directing streams of air, one from above and one from below said nozzle, in forwardly converging relation to impinge on said conical oil spray after it leaves said nozzle and tending to flatten the shape of the flame produced by said burner, said baffle means including a forwardly projecting conical shield surrounding said nozzle and spaced therefrom to provide for the emission of a relatively thin annular stream of air around all sides of said nozzle at the front end thereof.

13. In an oil burner, a tubular conduit for supplying air, an atomizing nozzle located substantially centrally at the outlet end of said conduit for producing a substantially conical spray of oil, an air head at the outlet end of said conduit having upper and lower front walls converging toward one another in a forward direction and terminating in a substantially rectangular discharge mouth with long upper and lower edges and relatively short side edges, baffle means at the right and left sides of said nozzle for intercepting the straight flow of air through said discharge mouth adjacent the sides of said nozzle, said baffle means cooperating with the converging front walls of said head for directing streams of air, one from above and from below said nozzle, in forwardly converging relation to impinge on said conical oil spray after it leaves said nozzle and tending to flatten the shape of the flame produced by said burner, and said baffle means including a forwardly projecting conically shaped shield surrounding said nozzle and having provision for admitting two straight flow lateral streams of air through said discharge mouth at the outside of said conical shield, one stream at the right side and one at the left side of said nozzle, said straight flow lateral streams being of smaller volume than said upper and lower converging streams.

14. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, which last named passages communicate with said central opening and thus with said conduit, and a mechanical atomizing nozzle mounted within said hollow shield and arranged to emit through said central aperture a spray of oil.

15. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, which last named passages communicate with said central opening and thus with said conduit, and a mechanical atomizing nozzle supported within said shield in spaced concentrical relation and arranged to emit through said central aperture a spray of oil, the interior of said hollow shield communicating with said cental opening to permit air from said conduit to flow around the nozzle and be emitted from the central aperture in said shield.

16. In an oil burner, an air conduit, a closure head mounted in the outlet end of said conduit and having a central axial opening therethrough and two diametrically opposed air outlet passages therethrough disposed one on each side of said central opening, a hollow shield having a central aperture and mounted in said central opening and closing the same except for said aperture and two diametrically disposed air passages between the shield and said head, which last named passages communicate with said central opening and thus with said conduit, and a mechanical atomizing nozzle supported within said shield in spaced concentrical relation and arranged to emit through said central aperture a spray of oil, the interior of said hollow shield communicating with said cental opening to permit air from said conduit to flow around the nozzle and be emitted from the central aperture in said shield, said hollow shield having radial openings to interconnect the hollow interior of the shield and the second named air passages.

LEOLYN F. SPEAR.